United States Patent
Rau et al.

[19]

[11] Patent Number: 6,068,078
[45] Date of Patent: May 30, 2000

[54] ELECTRIC STEERING SYSTEM

[75] Inventors: Jim L. Rau, Shelby Township, Mich.; Emil M. Shtarkman, Marina Del Rey, Calif.

[73] Assignee: TRW Inc., Lyndhurst, Ohio

[21] Appl. No.: 09/098,136

[22] Filed: Jun. 16, 1998

[51] Int. Cl.⁷ ........................................... B62D 5/04
[52] U.S. Cl. ...................... 180/446; 318/489; 701/41
[58] Field of Search ....................... 180/443, 444, 180/446, 423; 701/41, 43; 318/489

[56] References Cited

U.S. PATENT DOCUMENTS

| | | |
|---|---|---|
| 4,624,335 | 11/1986 | Shiraishi et al. . |
| 4,653,601 | 3/1987 | Nakamura et al. . |
| 4,751,978 | 6/1988 | Drutchas et al. . |
| 4,756,375 | 7/1988 | Ishikura et al. . |
| 4,834,201 | 5/1989 | Miyazaki et al. ........................ 180/446 |
| 4,960,178 | 10/1990 | Abukawa et al. . |
| 5,000,278 | 3/1991 | Morishita ................................. 180/446 |
| 5,033,565 | 7/1991 | Abukawa et al. . |
| 5,345,154 | 9/1994 | King .......................................... 318/49 |
| 5,552,684 | 9/1996 | Wada et al. ............................. 318/293 |
| 5,711,394 | 1/1998 | Fujii et al. ............................... 180/422 |

OTHER PUBLICATIONS

Article entitled "Double–layer Capacitors Challenge Secondary Batteries", pp. 1–4.
Article entitled "Perspective on Ultracapacitors", pp. 1–6.

*Primary Examiner*—Brian L. Johnson
*Assistant Examiner*—Avraham H. Lerner
*Attorney, Agent, or Firm*—Tarolli, Sundheim, Covell, Tummino & Szabo L.L.P.

[57] ABSTRACT

An electric steering system (10) includes a power source (34) and an electric motor (28) which provides an auxiliary steering force in response to a large capacity capacitor (C1) being selectively connected to the power source (34), for charging the large capacity capacitor (C1), and to the motor (28), for discharging the large capacity capacitor (C1) to drive the electric motor (28) for providing the auxiliary steering force.

20 Claims, 2 Drawing Sheets

ELECTRIC STEERING SYSTEM

TECHNICAL FIELD

This invention relates to an electric steering system for providing auxiliary steering torque.

BACKGROUND OF THE INVENTION

There are numerous known power assist steering systems that provide additional steering torque when needed. These include conventional hydraulic steering systems, electric power assist hydraulic steering systems as well as electric power steering systems that include no hydraulics. Typically, an electric power steering system includes an electric motor coupled to an electric control unit responsive to movement of a hand steering wheel under preselected vehicle conditions. The electric motor, when activated, supplies an auxiliary steering force to a rack member to assist the driver during a steering maneuver. In general, an auxiliary steering force is desired at relatively low vehicle speeds such as during vehicle parking, especially when a relatively high torque is applied at the hand steering wheel.

Conventional electric steering systems have high power demands when operated, which often cause excessive strain on the vehicle electrical system. At lower vehicle speeds the vehicle alternator operates more slowly and, therefore, may not be able to supply sufficient power to both the vehicle loads and the electric steering system. The substantial power requirements of such electric power steering systems may lead to an undesirable operation of other vehicle electrical loads, such as dimming lights and slow operating wipers. Proposed solutions to address the additional drain on the vehicle electrical system have not been completely satisfactory, as they often require complicated generator structures, expensive components, and/or complex control equipment.

SUMMARY OF THE INVENTION

The present invention is directed to an electric steering system that includes a power source and an electric motor for providing an auxiliary steering force. The system also includes a large capacity capacitor having a capacitance of at least about 100 farads, which is selectively connectable to the power source for charging the large capacity capacitor and to the motor for discharging the large capacity capacitor to drive the electric motor. A control circuit responsive to at least one vehicle condition is also provided for selecting between the connection of the capacitor to the power source and connection of the capacitor to the electric motor.

BRIEF DESCRIPTION OF THE DRAWINGS

The foregoing and other features of the present invention will become apparent to one skilled in the art upon reading the following description with reference to the accompanying drawings wherein.

DESCRIPTION OF A PREFERRED EMBODIMENT

Figure 1:
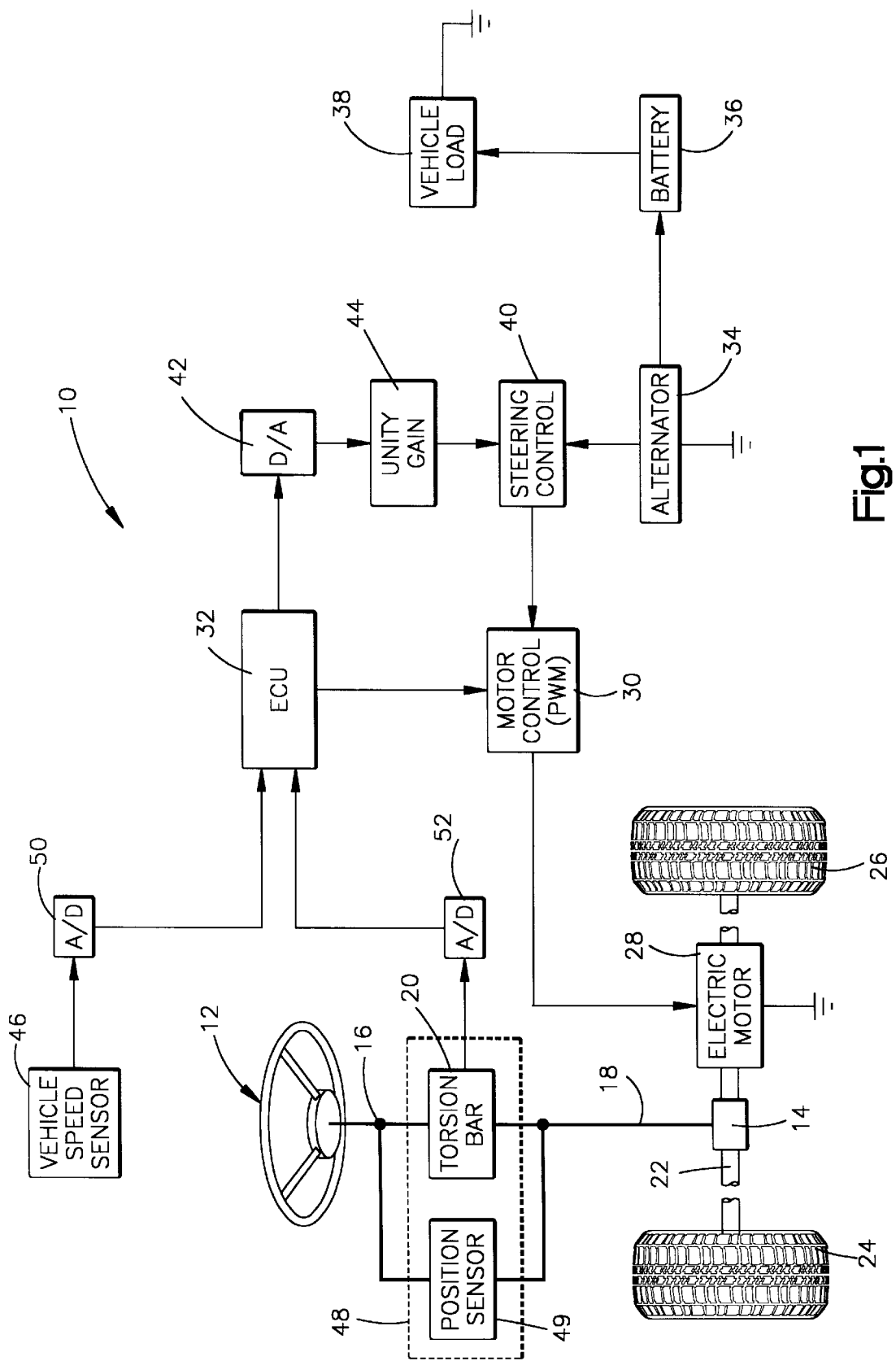
FIG. 1 is a schematic block diagram of a preferred embodiment in accordance with the present invention.
Figure 2:
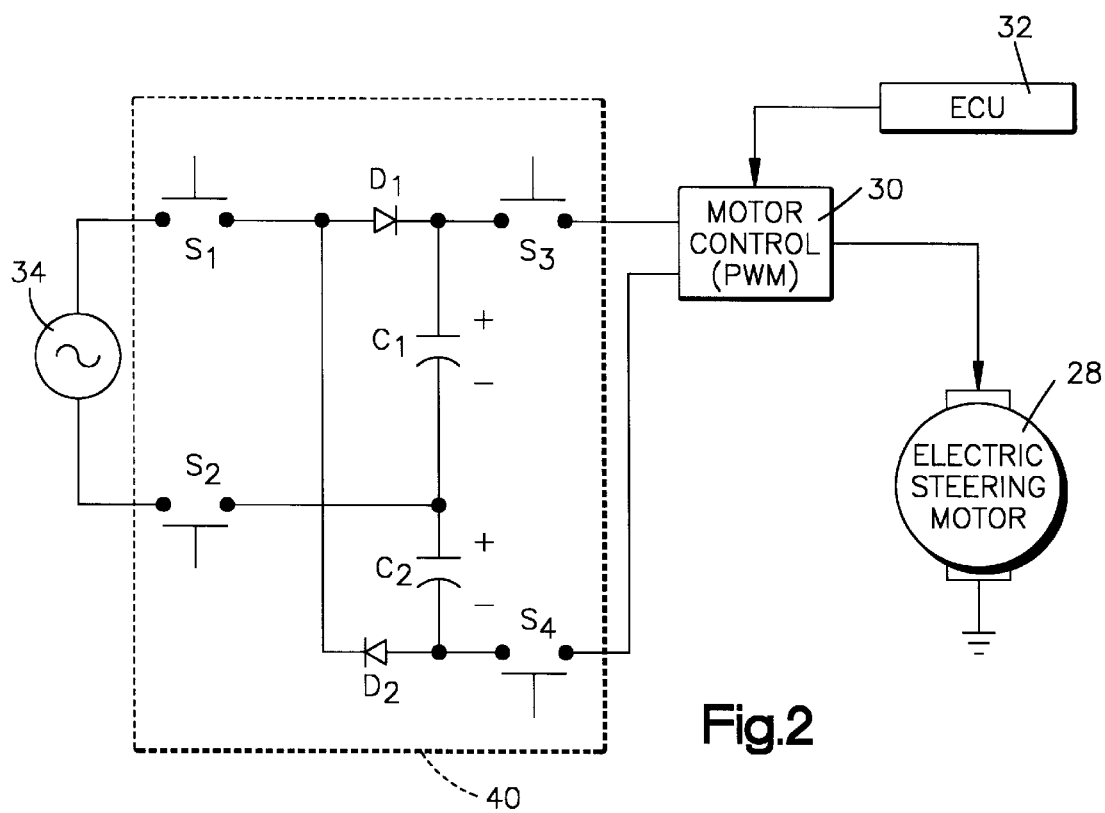
FIG. 2 is a partial view of the system of FIG. 1.

A preferred embodiment of the present invention is illustrated in FIGS. 1 and 2, in which like numerals refer to corresponding components. Referring to FIG. 1, a vehicle steering system, generally indicated as 10, includes a hand steering wheel 12 mechanically coupled to a pinion gear 14. More specifically, the hand steering wheel 12 is connected to an input shaft 16 and the pinion gear 14 is connected to an output shaft 18. The input shaft 16 is operatively coupled to the output shaft 18 through a torsion bar 20. The torsion bar 20 twists in response to an applied steering torque, thereby providing for relative rotation between the input shaft 16 and the output shaft 18. The pinion gear 14 meshingly engages rack teeth disposed on a steering rack member 22, which is connected to steerable wheels 24 and 26 of the vehicle in a known manner. Rotation of the hand steering wheel 12 causes steering movement of the wheels 24 and 26.

The preferred embodiment of the present invention also includes an electric steering motor 28, suitably a variable reluctance motor, that circumscribes the steering rack member 22 and is drivingly connected thereto by a ball-nut drive assembly (not shown). An acceptable ball-nut drive assembly is shown and described in U.S. Pat. No. 4,415,054 to Drutchas. The electric assist motor 28 provides an auxiliary steering force under certain vehicle conditions.

The electric motor 28 is connected to a motor control circuit 30, which preferably is a conventional pulse width modulation (PWM) subsystem that provides a predetermined amount of current to the electric assist motor 28 according to the desired amount and direction of auxiliary steering force. More specifically, the motor control circuit 30 is formed of a plurality of switches, suitably high power transistors such as MOSFETs, that are pulse width modulated in a known manner, such as by an electronic control unit ("ECU") 32 in response to one or more sensed vehicle conditions, such as vehicle speed and applied steering torque. Preferably, ECU 32 is a microcomputer but may also comprise a plurality of discrete circuits, circuit components, and/or an application specific integrated circuit (ASIC) configured to accomplish the desired functions.

The present invention also includes a power source 34, such as an alternator, that supplies electric energy, suitably about 16.5 volts AC, to a vehicle battery 36 that in turn supplies power to a vehicle load 38 including accessories, such as the vehicle light radio, windshield wipers, etc. In the preferred embodiment of FIG. 1, the alternator 34 also provides the 16.5 volts AC to a steering control circuit 40. The steering control circuit 40 is operatively coupled to the ECU 32 through a digital-to-analog (D/A) converter 42 and a unity gain amplifier 44. The ECU 32 provides active control of the steering control circuit 40 based upon an ECU steering control signal. The ECU steering control signal is responsive to at least one sensed vehicle condition.

In the preferred embodiment shown in FIG. 1, the ECU 32 is operatively coupled to a vehicle speed sensor 46 and a torque sensor 48. The vehicle speed sensor 46 senses vehicle speed in a known manner and provides a signal indicative of vehicle speed to the ECU 32 through an analog-to-digital (A/D) converter 50.

Similarly, the torque sensor 48 detects the applied steering torque and provides a signal indicative thereof. The torque signal is also passed to the ECU 32 through an appropriate A/D converter 52. Preferably, the torque sensor 48 is formed of a position sensor 49 and the torsion bar 20. The position sensor 49 is operatively connected across the input shaft 16 and the output shaft 18 and provides an electrical signal, namely the position signal, indicative of the relative rotational position between the input shaft 16 and the output shaft 18. The torque sensor 48 supplies the torque signal to the ECU 32 for causing the wheels 24 and 26 to rotate a desired amount in a desired direction.

The ECU 32, in response to the sensed vehicle conditions, effects activation of the electric steering motor 28 in situations where conventional rack-and-pinion manual steering is not adequate. Such a situation may exist during, for example, dry surface parking, forward movement of a vehicle on a curved dry road, steering of a vehicle at relatively low speed on a downgraded road or during other instances of high steering torque. In such high torque instances, the electric steering motor 28 should operate without inhibiting other vehicle electrical load operations. While the preferred electric steering system 10 is described as being responsive to applied steering torque and vehicle speed, it will be understood that the present invention also may be responsive to other sensed vehicle conditions in which an auxiliary steering force might be desired.

The preferred steering control circuit 40, as shown in FIG. 2, includes at least one large capacity capacitor C1, or ultracapacitor, and preferably two ultracapacitors C1 and C2, each having a capacitance greater than about 100 farads (F) and preferably at least about 1500 farads (F). Each such ultracapacitor also has an internal resistance less than about 10 ohms and preferably about 0.1 or less ohms. It will be appreciated that an ultracapacitor is especially well suited for this application because it has a relatively large time constant. More particularly, the steering control circuit 40 having a first voltage across the ultracapacitors C2 and C2 is capable of delivering a large amount of current, suitably about 100 amperes (A) or greater, over an extended time period of about ten seconds and then delivering a decreased current of about 70 amperes (A) for another ten seconds at a lower voltage. The ultracapacitors C1 and C2 also have a quick charge time and the ability to undergo repeated charge and discharge cycles without substantial deterioration. The steering control circuit 40 is thus able to supply sufficient power to the electric motor 28 to provide steering assist for about twenty seconds or more. With the typical steering maneuver taking an average of about 2.5 seconds, it is highly unlikely that the ultracapacitors C1 and C2 of the steering control circuit 40 will be completely discharged during normal steering maneuvers.

The magnitude of current supplied to the electric motor 28 is based upon the ECU 32 pulse-width-modulating the current from the ultracapacitors C1 and C2. If the applied torque demands are so great over an extended time period that the ultracapacitors C1 and C2 discharge to a voltage below a predetermined voltage, such as about 9 volts for a typical variable reluctance electric motor, the steering control circuit 40 may interrupt discharging of the ultracapacitors C1 and C2 and begin charging the ultracapacitors C1 and C2 until sufficient power is stored in the ultracapacitors for operating the motor 28.

Referring to FIG. 2, the ultracapacitors C1 and C2 are selectively connectable between the alternator 34 and the motor control circuit 30 through a switching network. Specifically, the positive side of the ultracapacitor C1 is connected to a first side of the alternator 34 through a series connection of a diode D1 and a switch S1, with the negative side of the ultracapacitor C1 connected to the other side of the alternator 34 through a switch S2. The positive side of the ultracapacitor C2 is connected to the second side of the alternator 34 through the switch S2 and to the negative side of the ultracapacitor C1. The negative side of the ultracapacitor C2 is connected to the first side of the alternator 34 through a diode D2 and the switch S1. The diode D2 is connected between the negative side of the ultracapacitor C2 and the node interposed between the switch S1 and the diode D1. The high power switches S1, S2, S3 and S4 preferably operate in response to control signals from the ECU 32. Under normal operating conditions, where no auxiliary steering force is needed, the switches S1 and S2 are normally closed and the switches S3 and S4 are normally opened. Preferably, the switches S1, S2, S3, and S4 are high power MOSFET or IGBT transistors. Of course, other known switching devices, including integrated switching circuits and mechanical switches, may be used. While the ultracapacitors C1 and C2 are each shown and described as single ultracapacitors, it will be understood and appreciated that each ultracapacitor could easily be replaced by a plurality of ultracapacitors, suitably two or more connected in parallel, thereby increasing the energy storage capacity of the steering control circuit 40. It also will be understood that the sign conventions of the ultracapacitors C1 and C2 are shown for clarity of explanation.

The switches S1, S2, S3 and S4 cooperate under the control of the ECU 32 to charge and discharge the ultracapacitors C1 and C2. In the charging mode, where the switches S1 and S2 are closed and the switches S3 and S4 are open, the steering control circuit 10 operates as a voltage doubler for charging the ultracapacitors C1 and C2. More particularly, when the sinusoidal alternator voltage is positive, the diode D1 will be forward biased to permit current flow through the ultracapacitor C1, preferably charging it to about 14 volts. As the alternator voltage goes negative, the diode D1 will no longer conduct and the diode D2 will become forward biased, with current flowing respectively through the switch S2, the ultracapacitor C2, the diode D2 and the switch S1. The current flow during the negative portion of the alternator voltage charges the ultracapacitor C2, also to about 14 volts. The diodes D1 and D2 thus rectify the alternator voltage to charge the ultracapacitors C1 and C2 during opposite polarity periods of the alternator voltage. Accordingly, the circuit shown in FIG. 2 is able to store about 28 volts across the serial connection of the ultracapacitors C1 and C2 (about 14 volts across each ultracapacitor) from the alternator voltage of about 16.5 volts.

In response to preselected vehicle conditions, such as those set forth herein, it is desired to discharge at least a portion of the energy stored in the ultracapacitor C1 and/or the ultracapacitor C2. Specifically, when it is determined that auxiliary steering force is needed, the ECU 32 closes the switches S3 and S4, while simultaneously opening the switches S1 and S2, such that the ultracapacitors C1 and C2 are serially connected for discharging electrical energy to the electric motor 28 through the motor control circuit 30. The discharged current is appropriately pulse-width-modulated, with a desired amount of current flowing from the ultracapacitors C1 and C2 to the motor control circuit 30 to the electric steering motor 28. The discharge time period for the ultracapacitors C1 and C2 will be determined by the ECU 32 according to the vehicle speed signal and the torque signal. In addition, the direction of current flow from motor control circuit 30 will be based upon the relative movement input shaft 16 with respect to the output shaft 18, namely based upon the direction in which the hand steering wheel 12 is rotated.

It will be appreciated that the switches S1, S2, S3 and S4 may also be controlled so that only one of the ultracapacitors C1 or C2 will be discharged for a desired time period. More specifically, where the torque demands are not very high, it may be desirable to only close the switch S3 or S4 as to discharge only the ultracapacitor C1 or C2, respectively. In addition, the steering control circuit 40 and the ECU 32 may be configured to consecutively alternate between discharging and charging the ultracapacitors C1 and C2 to provide extended periods of torque assist. When discharging one or both ultracapacitors C1 and C2, the switches S1 and S2 should be opened from their normally closed positions. The switches S1 and S2 may also be opened when the ultracapacitors C1 and C2 have been charged to their desired voltage levels.

In one particular example, the ECU 32 receives a torque signal indicating a steering maneuver, such as a turn, and a vehicle speed signal for relatively low speed through the respective A/D converters 50 and 52. The ECU 32 determines if the applied torque is greater than a first predetermined torque threshold value and if the sensed vehicle speed is less than a first vehicle speed threshold, such as about 5 to 10 miles per hour. It will be understood that the torque threshold value might be functionally related to the vehicle speed, as well as other possible vehicle conditions, with the torque threshold increasing for a given increase in speed. If both of these conditions are false, the ultracapacitors C1 and C2 continually are charged to a predetermined DC voltage by the alternator 34 in the manner set forth herein. If at least one of these conditions is true, another determination is made to determine the amount and direction of auxiliary force needed during the turn maneuver. The ECU 32 then will provide appropriate control signals to the steering control circuit 40 to discharge at least one of the ultracapacitors C1 or C2 during the steering maneuver, thereby providing power for the electric motor 28. If there is an extremely high torque demand at a relatively low vehicle speed, both ultracapacitors C1 and C2 may be operatively coupled to the motor control circuit 30, thereby making maximum current available to the electric steering motor 28 during the steering maneuver. After the turn is completed, the wheels 24 and 26 may be returned to their zero position or additional steering maneuvers may be performed.

The ultracapacitors C1 and C2, when discharging, preferably provide greater than about 500 watts to the electric motor 28. Of course, it will be understood that the amount of power discharged will be related to the size of the vehicle and the particular steering conditions. For example, about 500 watts may be supplied for a small vehicle and about 1500 watts for a larger vehicle.

While the foregoing describes a particularly preferred embodiment of the present invention, it is to be understood that the description is intended to illustrative and indicative only of the principles of the invention. Those skilled in the art will perceive improvements, changes and modifications, all of which are intended to be covered by the appended claims.

Having described the invention, the following is claimed:

1. An electric steering system comprising:
   a power source;
   an electric motor for providing an auxiliary steering force;
   an ultracapacitor selectively connectable to said power source, for charging said ultracapacitor, and to said motor, for discharging said ultracapacitor to drive said electric motor, said ultracapacitor having a capacitance greater than about 100 farads; and
   a control circuit, responsive to at least one vehicle condition, for selecting between connection of said ultracapacitor to said power source for charging said ultracapacitor and connection of said ultracapacitor to said electric motor for discharging said ultracapacitor to drive said electric motor.

2. A system as in claim 1, further comprising a torque sensor for sensing an applied torque and providing a signal indicative thereof, with said control circuit being responsive to said torque sensor.

3. A system as in claim 2, wherein said control circuit controls the charging and discharging of said ultracapacitor in response to said torque sensor signal.

4. A system as in claim 1, further comprising a vehicle speed sensor for sensing speed of a vehicle and providing a signal indicative thereof, said control circuit being responsive to said vehicle speed sensor signal.

5. A system as in claim 4, wherein said control circuit controls the charging and discharging of said ultracapacitor in response to said vehicle speed sensor.

6. A system as in claim 5, wherein said ultracapacitor discharges when said vehicle speed sensor provides a signal to said control circuit which indicates that the vehicle speed is less than about 10 miles per hour.

7. A system as in claim 1, wherein said ultracapacitor, when discharging, provides greater than about 500 watts to said motor.

8. A system as in claim 1, wherein said ultracapacitor has an internal resistance less than about 10 ohms.

9. A system as in claim 1, further comprising at least two ultracapacitors selectively connectable to said power source, for charging each of said ultracapacitors, and to said motor, for discharging each of said ultracapacitors to drive said electric motor, in which said control circuit selectively controls charging and discharging of each of said ultracapacitors in response to the at least one vehicle condition.

10. A system as set forth in claim 1 wherein said control circuit further includes first switch means connected between said power source and said ultracapacitor and second switch means connected between said ultracapacitor and said electric motor, said first switch means being selectively activated to electrically connect said ultracapacitor with said power source to charge said ultracapacitor, and said second switch means being selectively activated to electrically connect said ultracapacitor with said electric motor to discharge said ultracapacitor to drive said electric motor.

11. A system as set forth in claim 1 further including a motor controller connected between said control circuit and said electric motor, said motor controller controlling an amount of electrical current being provided by said ultracapacitor to drive said electric motor.

12. An electric steering system comprising:
    a dc power source;
    an electric steering motor;
    an ultracapacitor having a capacitance greater than about 100 farads selectively connectable to said power source for charging said ultracapacitor, and to said motor for discharging said ultracapacitor to drive said electric motor;
    a sensor for sensing a vehicle condition and generating a signal indicative of said vehicle condition; and
    a control circuit, responsive to said sensor signal, for selecting between connection of said ultracapacitor to said power source for charging said ultracapacitor and connection of said ultracapacitor to said electric motor for discharging said ultracapacitor to said electric motor.

13. A system as in claim 12 wherein said sensor comprises a vehicle speed sensor for sensing vehicle speed providing a signal indicative thereof.

14. A system as in claim 12 wherein said sensor comprises a torque sensor for sensing an applied steering torque and providing a signal indicative thereof.

15. A system as set forth in claim 12 wherein said control circuit further includes first switch means connected between said power source and said ultracapacitor and second switch means connected between said ultracapacitor and said electric motor, said first switch means being selectively activated to electrically connect said ultracapacitor with said power source to charge said ultracapacitor, and said second switch means being selectively activated to electrically connect said ultracapacitor with said electric motor to discharge said ultracapacitor to drive said electric motor.

16. A system as set forth in claim 2 further including a motor controller connected between said control circuit and said electric motor, said motor controller controlling an amount of electrical current being provided by said ultracapacitor to drive said electric motor.

17. An electric steering system comprising:

a power source;

an electric motor for providing an auxiliary steering force;

an ultracapacitor selectively connectable to said power source, for charging said ultracapacitor, and to said motor, for discharging said ultracapacitor to drive said electric motor, said ultracapacitor having a capacitance greater than about 100 farads; and a control circuit, responsive to at least one vehicle condition, which selectively connects said ultracapacitor to said power source for charging said ultracapacitor and selectively connects said ultracapacitor to said electric motor for discharging said ultracapacitor to drive said electric motor.

18. A system as set forth in claim 17 wherein said control circuit further includes first switch means connected between said power source and said ultracapacitor and second switch means connected between said ultracapacitor and said electric motor, said first switch means being selectively activated to electrically connect said ultracapacitor with said power source to charge said ultracapacitor, and said second switch means being selectively activated to electrically connect said ultracapacitor with said electric motor to discharge said ultracapacitor to drive said electric motor.

19. A system as set forth in claim 17 further including a motor controller connected between said control circuit and said electric motor, said motor controller controlling an amount of electric current being provided by said ultracapacitor to drive said electric motor.

20. A system as set forth in claim 19 wherein said motor controller controls the amount of electric current in response to at least one vehicle condition.

* * * * *

UNITED STATES PATENT AND TRADEMARK OFFICE
CERTIFICATE OF CORRECTION

PATENT NO. : 6,068,078
DATED : May 30, 2000
INVENTOR(S) : Jim L. Rau, Emil M. Shtarkman It is certified that error appears in the above-indentified patent and that said Letters Patent is hereby corrected as shown below:

Column 7, line 12, change "2" to "12"

Signed and Sealed this

Twenty-second Day of May, 2001

Attest:

NICHOLAS P. GODICI

Attesting Officer     Acting Director of the United States Patent and Trademark Office